Jan. 26, 1960      K. FEARNSIDE      2,922,884
INDICATING OR MEASURING APPARATUS
Filed Nov. 16, 1953      3 Sheets-Sheet 1

INVENTOR
Kenneth Fearnside,
BY Pierce, Scheffler + Parker
ATTORNEYS.

INVENTOR
Kenneth Fearnside
BY Pierce, Scheffler Parker
ATTORNEYS.

United States Patent Office 2,922,884
Patented Jan. 26, 1960

2,922,884

INDICATING OR MEASURING APPARATUS

Kenneth Fearnside, London, England, assignor, by mesne assignments, to Industrial Machinery Company Limited of London, London, England, a firm Application November 16, 1953, Serial No. 392,428

12 Claims. (Cl. 250—71)

This invention relates to indicating or measuring apparatus, capable of responding to inhomogeneities in materials. The invention is particularly concerned with the provision of an apparatus which is capable of detecting variations or voids in cigarettes or the like, and hereinafter the invention will be so described but as will appear, the invention can be applied to the examination of other materials.

In one method of manufacturing cigarettes, tobacco is fed on to a moving band of paper, which is subsequently rolled around the tobacco to form a continuous rod, the rod being cut into appropriate lengths to form the finished cigarettes. In order to secure an even quality of cigarettes it is desirable that the average weight per cigarette should be constant, the individual weight of any given cigarette should lie between quite close limits, for example twenty to twenty-four to the ounce, and there should be no voids in the tobacco in the rod.

Since the manufacture of cigarettes is highly mechanised, it is very desirable to have some device for detecting imperfections of the tube; various suggestions have been made for such devices but none of these suggestions has, however, been completely satisfactory.

The present invention has for its object to provide means whereby imperfections especially voids and certain other variations of a cigarette or like rod or tube can be detected, and which lends itself to incorporation in apparatus for rejecting imperfect articles or for controlling the process of manufacture.

In an apparatus in accordance with the present invention the cigarette or like article to be examined is moved with respect to an inspection device in which the article is subjected to radiation which is caused to pass through the article in a plurality of directions in a transverse plane, which radiation is alternated by the material of the article, and the transmitted radiation is detected and applied to a suitable indicating, measuring, alarm or control apparatus.

The nature of the invention, and other features and advantages of it, will be apparent from the following description of one embodiment, as applied to an apparatus for examining the cigarette rod, in conjunction with the accompanying drawings in which.

The apparatus of this embodiment of the invention, which uses a radioactive source of beta particles, affords an instantaneous indication at a given point in the cycle of manufacture of the weight of each individual cigarette; it provides an indication over a period of seconds of the integrated weight of the rod, and by which the rate of feed of tobacco can be controlled and provides an ejection or marking device by which cigarettes containing a void in the tobacco can be rejected.

Figure 1:
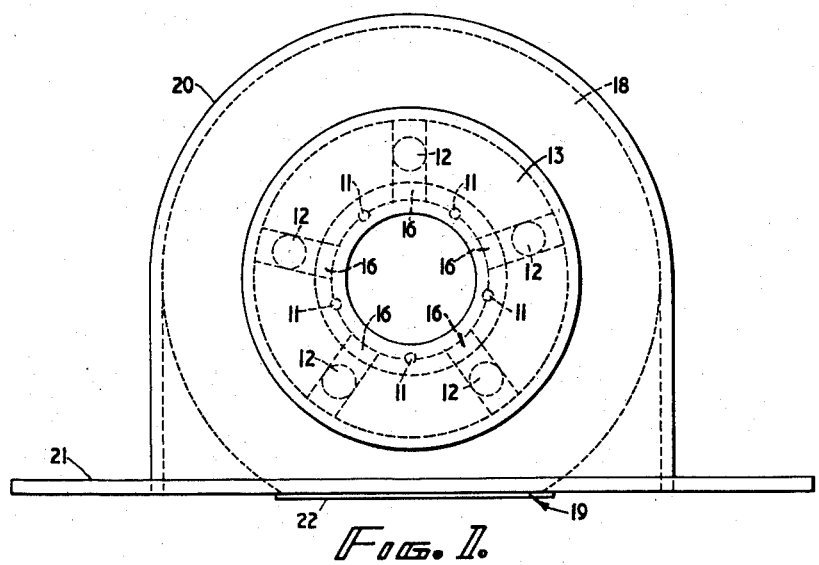
Figure 1 is an end elevation of the inspection head.
Figure 2:
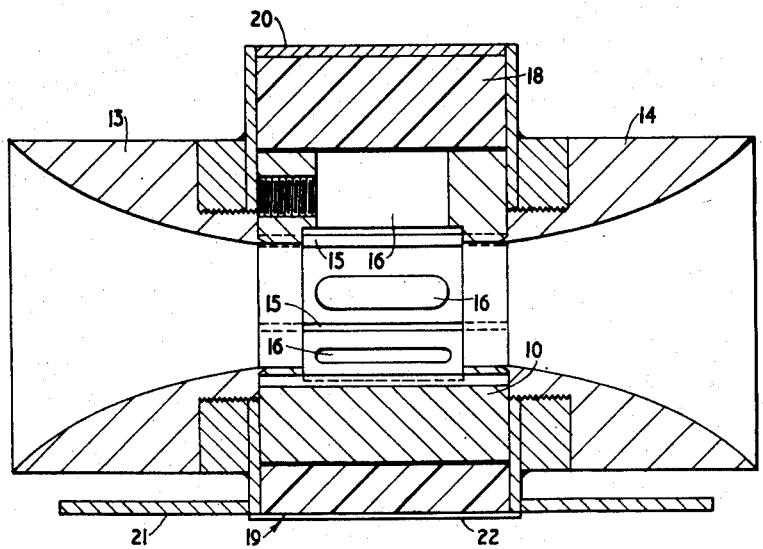
Figure 2 is a longitudinal section of the head of Figure 1 with the radiation sources and detectors removed.

As shown in Figures 1 and 2, the apparatus comprises a metal sleeve 10, through which the cigarette rod passes, and which contains five radioactive sources at 11 and five radiation detectors, or so-called "counters" at 12. The sleeve is composed of metal such as brass, and has a stepped central opening of circular cross-section in the two end portions of which the cigarette rod, not shown, is a close fit; coned surfaces on entrance and exit guides 13 and 14 are located at the end portions of this central opening.

The sources are in the form of five narrow gauge steel tubes 11, which are filled with radioactive material and are inserted in locating holes in the sleeve; these holes are drilled parallel to the axis of the central opening and spaced a short distance from the surface of the end portions of the central opening, and radiation is directed into the opening through narrow radial slots 15 formed by the intersection of the holes and the stepped part of the central opening between the two end portions of such central opening.

The radioactive materials which have been used are strontium 90 and radium D plus E. The former is a pure beta emitter of half life twenty five years, and with a beta energy of 2.2 mev. The latter emits beta radiation of 1.17 mev. and gamma radiation of 47 kev. and has a half life of 22 years. The radium is more sensitive for the normal cigarette, but the strontium has the advantage of being a pure beta emitter and being much cheaper.

The radiation detectors 12 each comprise a phosphor crystal or rod, not shown in detail, but such as one referred to in my co-pending United States application No. 392,427 filed November 16, 1953 inserted in one of a further series of locating holes in the sleeves. These holes are also five in number but are larger than the source holes, and are spaced a greater distance from the centre opening, equidistant between the source holes. Relatively wide slots 16 extend from the holes both to the centre opening and to the outer surface of the sleeve, as shown at the upper part of Figure 2. Opaque thin metal foils are arranged to shield the crystals from light from the central opening.

It may be pointed out that one of the difficulties to be overcome in the construction of such a device for examining the cigarette rod is that the density of the rod varies considerably from point to point both axially and radially. It is therefore not sufficient to use a single rectangular source and detector since the amount of radiation transmitted depends on the orientation of the cigarette as well as its weight, unless the longest path through the cigarette results in the absorption of very little radiation. For optimum sensitivity this longest path should be several times the half thickness of the beta radiation concerned and this simple source arrangement is therefore ruled out.

The geometry of the arrangement described is such that radiation directed from each source into the centre opening, is seen by the three detectors on the opposite side of the opening and not by the other two detectors.

In such an arrangement the count rate is very much less sensitive to the orientation of the cigarette rod whatever the nature of the packing, and further any variations which are symmetrical about the axis will be cancelled out. While it is not possible to show mathematically that this arrangement can cancel out all variations, it can be shown by numerical calculation that for inhomogeneities of circular cross-section, the centres of which may not coincide with the centre of the scintillatable phosphor rod 12, provided the density variations do not exceed three to one and each phosphor can receive direct radiation from the three sources most remote from it, this arrangement allows the observation of a count rate which depends only on the total weight of the cigarette rod and not on its orientation, with an accuracy of approximately ¼%.

In known manner the phosphor rods 12 will scintillate when radiation is incident upon them, and this light is collected by an optical system and is caused to fall upon the cathode of a photo-multiplier tube. This optical system consists of an annulus 18 of a light transmissive medium, preferably methyl methacrylate or like plastic material, which embraces the outer surface of the centre section of the sleeve. At one part of the periphery of the annular at 19 a flat surface is cut on a chord of the circle, and the cathode 22 of the photomultiplier is mounted against the flat surface. The annulus acts as a light trap, so that the total light output from the phosphor rods 12 is directed onto the tube cathode. A combined shroud and casing 20 is provided for the device the casing having a mounting plate 21 lying approximately in the plane of the flat surface of the annulus.

Figure 3:
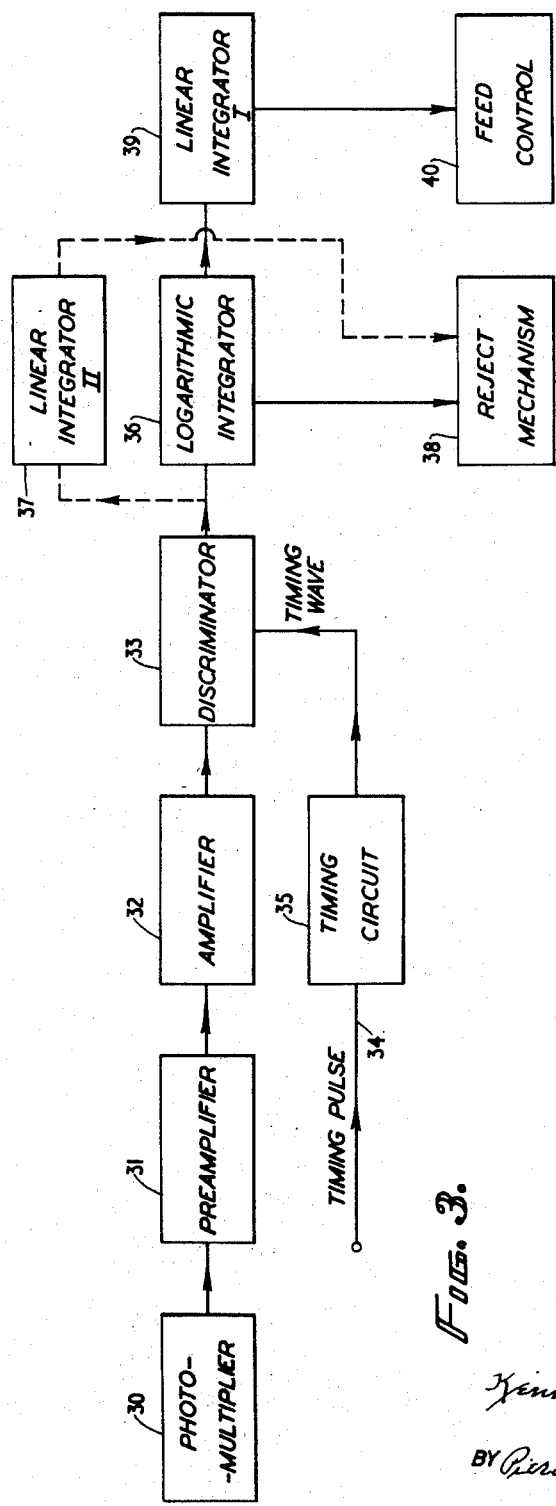
Figure 3 is a block schematic diagram of the electrical circuits.

The electrical arrangement is shown in block diagrammatic form in Figure 3. The output from the photomultiplier 30 is fed to a preamplifier 31 and stabilised amplifier 32 and discriminator 33, which are suitably of the type described in my aforesaid co-pending application Ser. No. 392,427. In addition, a timing pulse derived from the cigarette making machine is fed over path 34 to a timing circuit at 35 and there initiates a gate pulse of predetermined duration which opens the output of the amplifier 32 for a period only slightly less than the time required for one cigarette to pass through the source unit; at the end of this time the amplifier output is suppressed. The amplified pulses are fed to the discriminator 33, which permits only those exceeding a pre-selected voltage level to be passed on to two integrating circuits 36 and 37. The first of these is arranged to provide an output voltage pulse corresponding to the integral over the period of the gate pulse of the logarithm of the count rate fed to it from the discriminator 33. It will be appreciated that the absorption of beta radiation in the cigarette obeys an exponential law and that therefore in order to produce an output pulse of amplitude proportional to cigarette weight this logarithmic integrating circuit is essential. In practice, the output from the integrating circuit 36 is an indication of the weight of each cigarette since the length of the gate pulse is only slightly less than the passage period for a whole cigarette length.

The output voltage of the logarithmic integrating circuit 36 is fed at the end of the cycle to the reject mechanism 38 which rejects individual cigarettes which have too high or too low a weight. It is also fed to a linear integrator 39 which integrates over two seconds and provides an output voltage which is used to control the machine, for example to a feed control 40 for the tobacco. The integrating circuit 37, is also fed from the discriminator 33 and provides an output voltage proportional to the number of counts coming from the discriminator. When an empty spot occurs in the cigarette rod the count rate rises to a value ten or twenty times normal and the linear integrator therefore provides a large voltage corresponding to these points, which is used at 38 to eject the offending cigarette.

Figure 4:
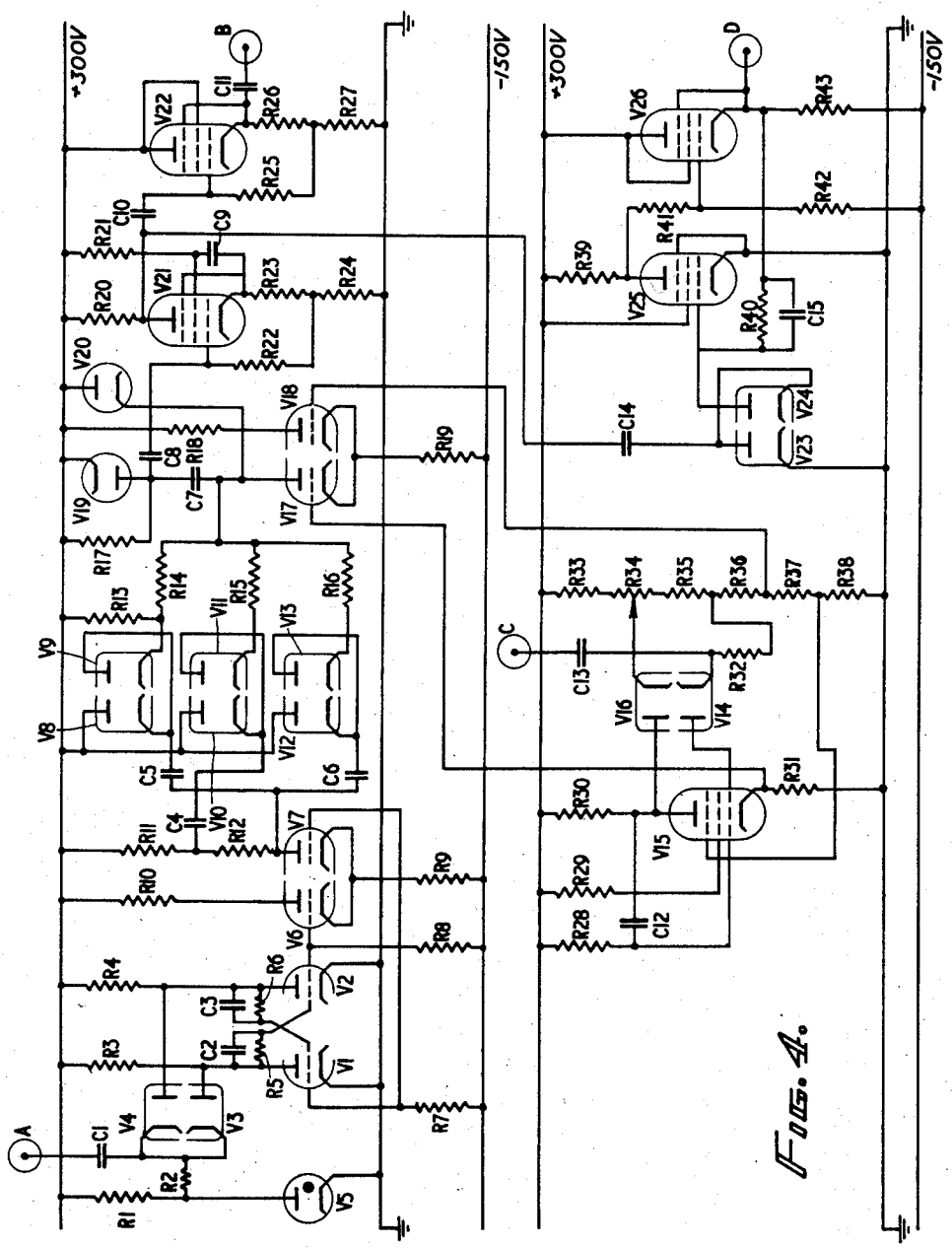
Figure 4 is a more detailed circuit diagram of the integrator circuits.

The integrating and associated circuits are shown in more detail in Figure 4. The logarithmic integrating circuit is of type due to Cooke-Yarborough and Pulsford (Journal of the Institution of Electrical Engineers, Part III, November 1950). This comprises a monostable multivibrator comprising two valves V1 and V2, to the anodes of which pulses from terminal A are applied through clamp diodes V3, V4, the clamping voltage being determined by a voltage stabiliser tube V5. The output pulses from the multivibrator are shaped by means of a second, cathode-coupled, bi-stable multivibrator comprising valves V6, V7, and are then applied in parallel through respectively three capacitors, C4, C5, C6 three "diode pumps," similar to those described in my aforesaid co-pending application Ser. No. 392,427, and including the diodes V8, V9, V10, V11, and V12, V13 and three resistances R14, R15, R16, to a common charging capacitor C7. These three charging circuits have different effective time constants and as a result there is produced a charging current for the condenser which is proportional to the pulse count rate between $5 \times 10^3$ and $10^5$ counts per second.

As explained in connection with Figure 3, counting is effected during intervals timed by the timing circuit 34, and this timing circuit is shown also in Figure 4. Initiating pulses are derived in any suitable manner from the machine and are applied to terminal C from where they are fed through diode clamp valve V14 to a phantastron valve V15; a further diode V15 acts as a clamp for the anode of the valve V16. The charging capacitor C7 is included in the anode circuit of a control valve V17 which is one of a cathode-coupled trigger pair V17, V18. The timing pulse from the phantastron valve, which is an accurately timed square pulse, is applied to the control grid of the valve V17 of the trigger pair. The charging capacitor C7 in series with a resistor R17 included in the anode circuit of the valve V17, the resistor being shunted by a diode V19, and a second diode V20 is connected between the anode of valve V17 and the anode supply.

Between counting cycles the grid of the valve V18 is maintained relatively positive, the valve takes current through the diode V20 which is thereby effectively a short circuit for the charging capacitor. When the phantastron emits its pulse, the valve V17 takes current, cuts off the anode current of valve V18 and the capacitor C7 is allowed to charge through the series resistor R17. When the phantastron pulse ends the capacitor C7 discharges exponentially through the resistor R17 and through the anode-cathode circuit of the valve V18 of the pair. It is arranged that the voltage developed on the charging capacitor C7 during the phantastron pulse time is small compared with the voltage of the pulse feeding the diode pumps.

At the end of the phantastron pulse the voltage across the capacitor C7 appears across the discharge resistor R17 and this voltage is amplified by a linear amplifier valve V21 and there fed to a cathode-follower output stage including valve V22. This output is fed to terminal B; in conjunction with a comparator circuit it can be used to reject under or over weight cigarettes as described above.

The output from the linear amplifier valve V21 is applied through capacitor C14 to an integrator circuit, having a time constant of about 2 seconds. A diode pump, including valve V23, V24, is again used, and the integrator capacitor C15 and resistor R40 are included in the input to a further linear amplifier valve V25, which in turn feeds a cathode-follower output valve V26. This output applied to terminal D in conjunction with a comparator circuit, can be used to control the average rate of feed of tobacco to the cigarette rod as described above.

The third integrating circuit, for detecting voids in the tobacco is not shown in the drawing but is similar to the integrator including the valves V23, V24, V25 and V26. This last integrator is fed directly from input pulses applied at terminal A.

It will be recognised by those skilled in the art that circuits of the individual valves or pairs of valves included in Figure 4 are of a type known per se, and for this reason the circuits have not been described in detail. However, the various resistors, of which some have been referred to already, bear references R1 to R43, the capacitors likewise bear references C1 to C15. In this particular embodiment, these components were given the following values:

CAPACITORS

| | |
|---|---|
| C1 | 500 pf. |
| C2 | 22 pf. |
| C3 | 22 pf. |
| C4 | 100 pf. |
| C5 | 100 pf. |
| C6 | .001 mf. |
| C7 | .2 mf. |
| C8 | .001 mf. |
| C9 | .1 mf. |
| C10 | .001 mf. |
| C11 | .1 mf. |
| C12 | .03 mf. |
| C13 | 500 pf. |
| C14 | .01 mf. |
| C15 | .2 mf. |

RESISTORS
(Ohms)

| | |
|---|---|
| R1 | 22K |
| R2 | 2K |
| R3 | 22K |
| R4 | 22K |
| R5 | 220K |
| R6 | 220K |
| R7 | 330K |
| R8 | 330K |
| R9 | 15K |
| R10 | 4.7K |
| R11 | 4.7K |
| R12 | 680 |
| R13 | 47K |
| R14 | 470K |
| R15 | 470K |
| R16 | 470K |
| R17 | 1K |
| R18 | 5K |
| R19 | 3.3K |
| R20 | 5K |
| R21 | 33K |
| R22 | 100K |
| R23 | 100 |
| R24 | 470 |
| R25 | 100K |
| R26 | 470 |
| R27 | 5K |
| R28 | 2M |
| R29 | 10K |
| R30 | 330K |
| R31 | 4.7K |
| R32 | 10K |
| R33 | 22K |
| R34 | 30K |
| R35 | 10K |
| R36 | 47K |
| R37 | 3.3K |
| R38 | 3.3K |
| R39 | 220K |
| R40 | 10M |
| R41 | 1M |
| R42 | 1M |
| R43 | 22K |

The valves used were as follows:

| | |
|---|---|
| V1, V2; V6, V7; V17, V18 | type 65N7 |
| V3, V4; V8, V9; V10, V11; V12, V13; V19, V20; V24, V25 | type 6H6 |
| V21, V22; V25; V26 | type EF80 |
| V5 | type VR150 |
| V15 | type 6F32 |

I claim:

1. In an apparatus adapted to respond to variations in the mass content of an elongated body movable longitudinally of itself the combination comprising a plurality of radioactive sources arranged about the body to direct radiation simultaneously therefrom transversely through substantially the same portion of the length of said body at different angles in the transverse plane and a plurality of radiation detectors likewise arranged about the body and each said detector being positioned to receive radiation from a plurality of said radioactive sources after passing through the body.

2. Apparatus as defined in claim 1 wherein said body is cylindrical and said radiation sources and detectors are grouped radially about the body.

3. Apparatus as defined in claim 2 wherein each said radiation source and its associated detector lie on a diameter through the body.

4. Apparatus as defined in claim 1 wherein said detectors are scintillatable members and which further includes means for totalizing the output of said detectors, said totalizing means comprising a body of light transmissive material surrounding said detectors and arranged to receive the light emitted by said detectors, said emitted light being trapped within said body of light transmissive material by internal reflection, and photosensitive means arranged adjacent a surface of said body of light transmissive material to receive the light trapped therein.

5. In an apparatus adapted to respond to variations in the mass content of an elongated cylindrical body movable longitudinally of itself, the combination comprising an annular member surrounding said body, said annular member being provided with a first group of radially spaced recesses containing radioactive sources and a second group of radially spaced recesses disposed respectively diametrically opposite the recesses of said first group and containing scintillatable detector members, each said detector member being positioned to receive radiation from a plurality of said radioactive sources after passing through the body, an annular body of light transmissive material surrounding said annular member and arranged to receive the light emitted by said detector members, the light emitted by said detector members being trapped within said annular light transmissive body by internal reflection, and photosensitive means arranged adjacent a surface of said annulus to receive the light trapped therein.

6. Apparatus as defined in claim 5 wherein there are five equally radially spaced recesses in said first and second recess groups, the recesses of each group being located respectively between adjacent recesses of the other group, and said radiation sources and detector members being located in their corresponding recesses such that radiation directed from each source is seen by the diametrally opposite detector member and also by the two detector members adjacent thereto but not seen by the two detector members adjacent said source.

7. Apparatus as defined in claim 1 and which further includes means totalizing the output from said radiation delectors, a discriminator to which is applied an input derived from said totalized output, means for producing uniform pulses in response to the output of said discriminator, and a device integrating said pulses, said integrating device having an approximately logarithmic characteristic.

8. Apparatus as defined in claim 7 and which further includes means repeatedly effecting said integration over limited intervals of time.

9. Apparatus as defined in claim 8 and which further includes means effecting a control function related to said elongated body when the integrated value over a period of time falls without predetermined limits.

10. Apparatus as defined in claim 8 and which further includes means integrating linearly the logarithmically integrated output over other intervals of time greater than the time intervals at which the logarithmic integration is repeated.

11. Apparatus as defined in claim 10 and which further includes means effecting a function related to said elongated body when said linearly integrated output over one of said other time intervals falls without predetermined limits.

12. Apparatus as defined in claim 1 wherein there are five equally radially spaced radioactive sources and five equally radially spaced radiation detectors alternating with said radioactive sources and located respectively diametrally opposite one of said radioactive sources, each of said radiation detectors receiving radiation from the diametrally opposite radioactive source and also from the two radioactive sources adjacent to said diametrally opposite source but not receiving radiation from the other two radioactive sources.

References Cited in the file of this patent

UNITED STATES PATENTS

| | | |
|---|---|---|
| 2,097,760 | Failla | Nov. 2, 1937 |
| 2,525,292 | Fua | Oct. 10, 1950 |
| 2,583,143 | Glick | Jan. 22, 1952 |
| 2,656,470 | Herzog | Oct. 20, 1953 |
| 2,704,079 | Molins et al. | Mar. 15, 1955 |